United States Patent
Kim et al.

(10) Patent No.: US 12,541,969 B2
(45) Date of Patent: Feb. 3, 2026

(54) FRUIT QUANTITY MEASUREMENT SYSTEM AND METHOD

(71) Applicant: KOREA PHOTONICS TECHNOLOGY INSTITUTE, Gwangju (KR)

(72) Inventors: Seon Hoon Kim, Gwangju (KR); Doo Gun Kim, Gwangju (KR); Young Ho Song, Gwangju (KR); Seung Heon Han, Gwangju (KR); Ju Hyeon Choi, Gwangju (KR); Jeong Hwan In, Gwangju (KR)

(73) Assignee: KOREA PHOTONICS TECHNOLOGY INSTITUTE, Gwangju (KR)

( * ) Notice: Subject to any disclaimer, the term of this patent is extended or adjusted under 35 U.S.C. 154(b) by 292 days.

(21) Appl. No.: 18/235,388

(22) Filed: Aug. 18, 2023

(65) Prior Publication Data

US 2023/0401845 A1 Dec. 14, 2023

Related U.S. Application Data

(63) Continuation of application No. PCT/KR2022/003233, filed on Mar. 8, 2022.

(30) Foreign Application Priority Data

Mar. 16, 2021 (KR) .......................... 10-2021-0033932

(51) Int. Cl.
*G06V 20/17* (2022.01)
*G05D 1/00* (2006.01)
(Continued)

(52) U.S. Cl.
CPC ............ *G06V 20/17* (2022.01); *G05D 1/0094* (2013.01); *G05D 1/101* (2013.01); *G06V 10/764* (2022.01);
(Continued)

(58) Field of Classification Search
CPC ...... G06V 20/17; G06V 20/68; G06V 20/188; G06V 10/774; G06V 10/764; G05D 1/0094; G05D 1/101
See application file for complete search history.

(56) References Cited

U.S. PATENT DOCUMENTS

| | | | |
|---|---|---|---|
| 2009/0077872 A1* | 3/2009 | Faria ...................... | A01G 13/06 47/2 |
| 2017/0181383 A1 | 6/2017 | Shen et al. | |
| 2023/0177330 A1* | 6/2023 | Readick ................... | G06N 3/08 706/25 |

FOREIGN PATENT DOCUMENTS

| | | |
|---|---|---|
| CN | 111582234 A | 8/2020 |
| KR | 10-2017-0091352 A | 8/2017 |

(Continued)

OTHER PUBLICATIONS

Chika Yinka-Banjo and Olasupo Ajayi, "Sky-Farmers: Applications of Unmanned Aerial Vehicles (UAV) in Agriculture", 2019 Autonomous vehicles (Dec. 17, 2019), pp. 107-128.

(Continued)

*Primary Examiner* — Adnan M Mirza
(74) *Attorney, Agent, or Firm* — Dinsmore & Shohl LLP; Yongsk Choi, Esq.

(57) ABSTRACT

A fruit quantity measurement system includes an unmanned aerial vehicle configured to receive GPS information about a fruit tree region of a predetermined area and an RF signal transmitted from an RF transmitter installed for each fruit tree and provide fruit tree images captured using at least one image sensor while flying based on a predetermined flight plan over the fruit tree region, and a monitoring server configured to be connected to the unmanned aerial vehicle through a communication network to receive GPS information and an RF signal from the unmanned aerial vehicle, match and store location data for each fruit tree, analyze the (Continued)

fruit tree image, measure the number of fruits for each fruit tree, store fruit counting information, and provide the stored location data or fruit counting information for each fruit tree according to a request from a user terminal authorized in advance.

7 Claims, 11 Drawing Sheets

(51) Int. Cl.
  *G06V 10/764* (2022.01)
  *G06V 10/774* (2022.01)
  *G06V 20/10* (2022.01)
  *G06V 20/68* (2022.01)
  *B64U 10/13* (2023.01)
  *B64U 101/00* (2023.01)
  *B64U 101/30* (2023.01)

(52) U.S. Cl.
  CPC .......... *G06V 10/774* (2022.01); *G06V 20/188* (2022.01); *G06V 20/68* (2022.01); *B64U 10/13* (2023.01); *B64U 2101/00* (2023.01); *B64U 2101/30* (2023.01)

(56) References Cited

FOREIGN PATENT DOCUMENTS

| KR | 10-2018-0110559 A | 10/2018 |
| KR | 10-1929129 81 | 12/2018 |

OTHER PUBLICATIONS

Lucas Prado Osco, "A convolutional neural network approach for counting and geolocating citrus-trees in UAV multispectral imagery", ISPRS Journal of Photogrammetry and Remote Sensing 160 (Feb. 2020).

Orly Enrique Apolo-Apolo, "A Cloud-Based Environment for Generating Yield Estimation Maps From Apple Orchards Using UAV Imagery and a Deep Learning Technique", Frontiers in plant science (Jul. 15, 2020), pp. 1-15.

"Sky-Farmers: Applications of Unmanned Aerial Vehicles (UAV) in Agriculture", Chika Yinka-Banjo et al., Intech Open, Chapter Six, 2019, pp. 107-128.

"A Convolutional Neural Network Approach for Counting and Geolocating Citrus-Trees in UAV Multispectral Imagery", Lucas Prado Oscoa et al., ISPRS Journal of Photogrammetry and Remote Sensing 160, pp. 97-106.

"A Cloud-Based Environment for Generating Yield Estimation Maps From Apple Orchards Using UAV Imagery and a Deep Learning Technique", Orly Enrique Apolo-Apolo et al., Frontiers in Plant Science, vol. 11, Article 1086, Jul. 2020, pp. 1-15.

* cited by examiner

FRUIT QUANTITY MEASUREMENT SYSTEM AND METHOD

CROSS-REFERENCE TO RELATED APPLICATIONS

This application claims is a national phase of International Application No. PCT/KR2022/003233 filed on Mar. 8, 2022, which claims priority to Korean Patent Application No. 10-2021-0033932 filed on Mar. 16, 2021, the entire contents of which are herein incorporated by reference.

This patent is the result of a study conducted with the support of the Korea Institute for Advancement of Technology with financial resources from the Korean government (Ministry of Trade, Industry and Energy) in 2021 (Unique Project Number 1415176969, Detailed Project Number: P0014718, Project name: Smart farming demonstration spread project using 5G-based drones).

This patent is the result of a study conducted with the support of the Korea Evaluation Institute of Industrial Technology with financial resources from the Korean government (Ministry of Trade, Industry and Energy) in 2022 (Unique Project Number 1415181149, Detailed Project Number: 20018828, Project name: Development of optical filter for wavelength control and light source module for lighting device).

BACKGROUND

1. Field

The present invention relates to a fruit quantity measurement technique for measuring the number of fruits using a fruit tree image captured from top of a fruit tree.

2. Description of Related Art

The contents described in this Background Art merely provide background information on the present embodiment and do not constitute the related art.

Fruit counting of fruit trees is important information for producers to decide their intention to ship and to predict supply and demand. As a fruit counting method of fruit trees, sample survey and monitoring survey data are mainly used, so there is a high possibility that a subjective factor of a counter will be included.

As an example, as a method of predicting production, there is a method of calculating production by multiplying production (yield) per unit of mature tree area by a mature tree area. In this case, data announced by the National Agricultural Products Quality Management Service are used for the mature tree area, and data from sample farms and monitoring surveys are used to estimate the number of mature trees and production. If necessary, weather information such as temperature, sunlight, and precipitation may be additionally reflected. However, since the sample survey and monitoring survey are conducted directly by manpower, there is a problem that the surveys are inaccurate due to human subjectivity and the possibility of information change caused by meteorological disasters, diseases and pests, and the like.

According to the data of the National Agricultural Products Quality Management Service, the number of crops fluctuates every year due to weather damage such as typhoons and pests, and information on the number of fruit trees and fruits is bound to be inaccurate due to these weather disasters and pests.

Agricultural production information is collected from the National Agricultural Products Quality Management Service's 'Main Crop Production Trend' and the Rural Development Administration's 'Agricultural and Livestock Product Income Data Book', and data on the 'number of mature trees' are derived from the collected information. However, there is a possibility of an error in a reference value due to a dense orchard, that is, an increasing trend in the number of adult trees per unit area.

In addition, the method of calculating the number of fruits in a fruit tree recognizes a fruit region using color in a still image obtained by capturing a fruit tree with fruits such as apples and tangerines, and calculates the number of fruits using the recognized fruit region. The method of calculating the number of fruits using still images has been mainly used for research purposes, such as calculating the number of fruits for one fruit tree.

Therefore, in the case of trying to calculating the number of fruits for hundreds of thousands of fruit trees by the conventional method of calculating the number of fruits using still images, only when a person should directly capture still images for each fruit tree, the number of fruits for each fruit tree should be calculated using still images photographed for each fruit tree, and the number of fruits for each fruit tree should be summed, the number of fruits can be calculated for all fruit trees in the fruit farm.

As such, the conventional method of calculating the number of fruits using still images has limitations in calculating fruit production on large-scale fruit orchards, etc., or calculating the number of fruits on fruit trees of the entire fruit farmhouse for insurance compensation in case of a disaster.

FIG. 1 is a diagram explaining a method of calculating the number of fruits using a conventional image camera installed on the ground in the related art.

Referring to FIG. 1, in the conventional method of calculating the number of fruits, fruit trees and fruits are captured using two or more visible cameras 11 and 12 on the ground, and fruit counting is performed using fruit recognition and an angle.

In this case, similar to human eyes, the visible cameras 11 and 12 installed on the ground allow a detector to receive light reflected from an object, and convert the received light into an image, thereby recognizing the object.

Therefore, the conventional method of calculating the number of fruits may obtain an image of the front of the fruit trees captured by the visible cameras 11 and 12, but the rear of the fruit tree is a blind spot in which the visible camera may not acquire an image. Accordingly, the conventional method of calculating the number of fruits has a problem in that it is impossible to count the number of fruits in the blind spots.

In addition, in the conventional method of calculating the number of fruits, in the case of a dense orchard where fruit trees are dense, the visible cameras 11 and 12 may capture not only fruit trees to be measured but also the fruit trees adjacent to the fruit trees to be measured. As a result, there is a possibility that not only the fruit tree to be measured but also the fruits of adjacent fruit trees may be measured during fruit counting, which may cause errors in the fruit counting information itself.

SUMMARY

An object of one embodiment of the present invention is to provide a fruit quantity measurement system and method for accurately measuring the quantity of fruit using an RGB camera and an infrared camera mounted on an unmanned aerial vehicle.

According to an embodiment of the present invention, a fruit quantity measurement system includes: an unmanned aerial vehicle configured to receive GPS information about a fruit tree region of a predetermined area and an RF signal transmitted from an RF transmitter installed for each fruit tree and provide fruit tree images captured using at least one image sensor while flying based on a predetermined flight plan over the fruit tree region; and a monitoring server configured to be connected to the unmanned aerial vehicle through a communication network to receive GPS information and an RF signal from the unmanned aerial vehicle, match and store location data for each fruit tree, analyze the fruit tree image, measure the number of fruits for each fruit tree, store fruit counting information, and provide the stored location data or fruit counting information for each fruit tree according to a request from a user terminal authorized in advance.

The fruit quantity measurement system may further include: at least one or more GPS units configured to be installed at a boundary of the fruit tree region to provide GPS information.

The unmanned aerial vehicle may include one or more cameras using an RGB sensor and an infrared sensor.

The monitoring server may perform a deep learning-based fruit recognition algorithm that extracts fruit regions from the fruit tree image, extract features from the extracted fruit regions, and then provide fruit classification and prediction results based on the extracted features.

The deep learning-based fruit recognition algorithm may generate and stores training data for training a plurality of fruit images corresponding to big data, train a classifier by setting the features of each fruit, including a size, a shape, and a color of each fruit, as fruit determination criteria through the analysis of the stored training data, and output the classification and prediction results including a type and quantity of fruit for the fruit tree image input by the trained classifier.

According to another embodiment of the present invention, a fruit quantity measurement method performed by a monitoring server that performs a fruit tree monitoring function for a fruit tree region includes: a) acquiring GPS information about the fruit tree region, and generating a flight plan for at least one unmanned aerial vehicle for fruit tree recognition based on the acquired GPS information; b) transmitting a flight control signal to the unmanned aerial vehicle for moving the unmanned aerial vehicle to air above a predetermined fruit tree based on the flight plan of the unmanned aerial vehicle; c) identifying a predetermined fruit tree by receiving an RF signal transmitted from an RF transmitter installed in the fruit tree through the unmanned aerial vehicle, and matching and storing unique identification information of the predetermined fruit tree and location data; and d) receiving fruit tree images through the unmanned aerial vehicle, analyzing the fruit tree images, measuring the fruit quantity for each fruit tree, and storing fruit counting information.

The fruit quantity measurement method may further include: e) providing stored location data or fruit counting information for each fruit tree according to a request of a user terminal authorized in advance.

The unmanned aerial vehicle may include one or more cameras using an RGB sensor and an infrared sensor, and provide a fruit tree image including an RGB image and an infrared image through the camera.

In step d), the deep learning-based fruit recognition algorithm may extract fruit regions from the fruit tree image, extract features from the extracted fruit regions, and then provide fruit classification and prediction results based on the extracted features.

The deep learning-based fruit recognition algorithm may generate and stores training data for training a plurality of fruit images corresponding to big data, train a classifier by setting the features of each fruit, including a size, a shape, and a color of each fruit, as fruit determination criteria through the analysis of the stored training data, and output the fruit classification and prediction results including a type and quantity of fruit for the fruit tree image input by the trained classifier.

A monitoring server includes: a communication unit configured to perform a communication function with an unmanned aerial vehicle flying over a fruit tree region or a user terminal authorized in advance; a memory in which a program for performing a fruit quantity measurement method for the fruit tree region is recorded; and a processor configured to execute the program, in which the processor is connected to the unmanned aerial vehicle through a communication network by execution of the program to receive GPS information and an RF signal from the unmanned aerial vehicle, match and store location data for each fruit tree provided from the unmanned aerial vehicle, analyze the fruit tree image, measure the number of fruits for each fruit tree, store fruit counting information, and provide the stored location data or fruit counting information for each fruit tree according to a request from a user terminal.

Finally, the present invention may provide a computer readable recording medium on which a program for performing the fruit quantity measurement method is recorded.

DETAILED DESCRIPTION

Figure 1:
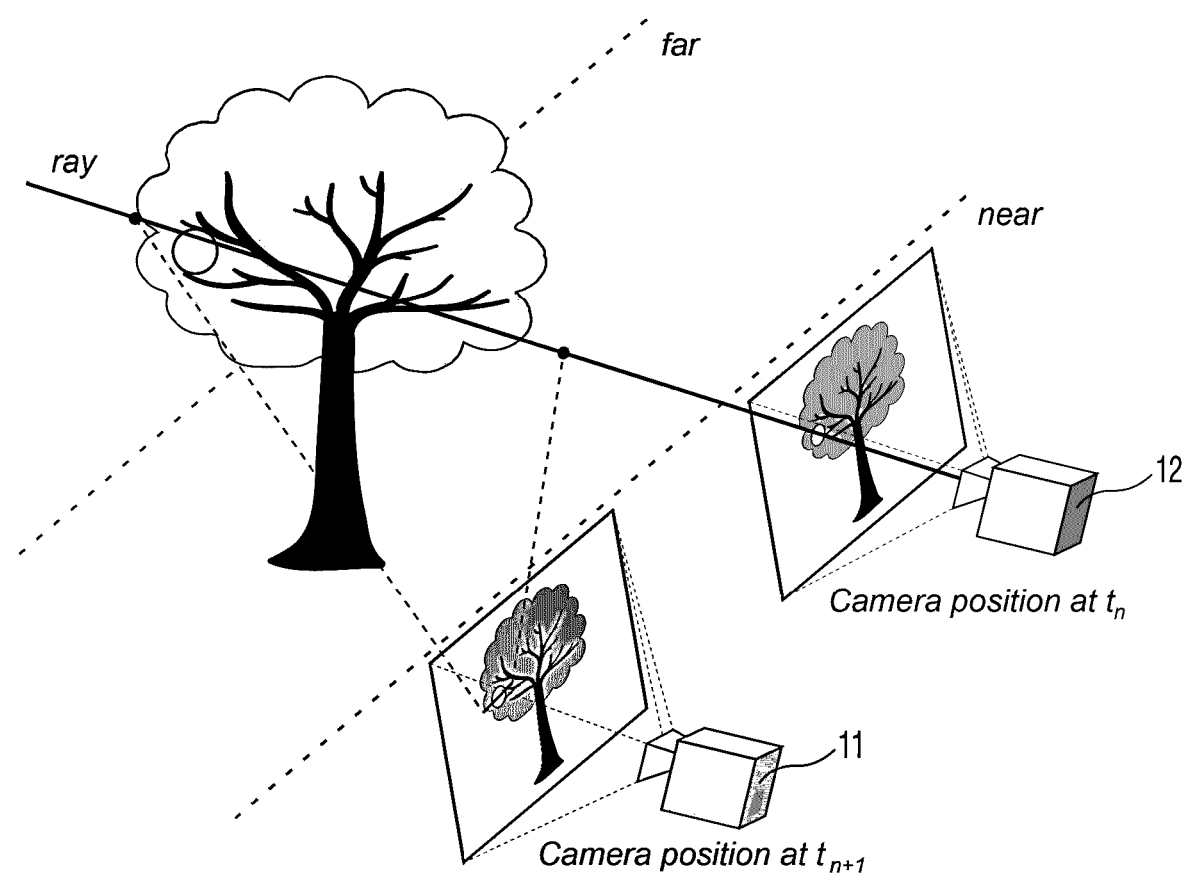
FIG. 1 is a diagram explaining a method of calculating the number of fruits using a conventional image camera installed on the ground in the related art.

The present invention may be variously modified and have several exemplary embodiments. Therefore, specific exemplary embodiments of the present invention will be illustrated in the accompanying drawings and be described in detail. However, it is to be understood that the present invention is not limited to a specific exemplary embodiment, but includes all modifications, equivalents, and substitutions without departing from the scope and spirit of the present invention. In describing each drawing, similar reference numerals are used for similar components.

Terms used in the specification, "first," "second," "A," "B" etc., may be used to describe various components, but the components are not to be interpreted to be limited to the terms. The terms are used only to distinguish one component from another component. For example, a first component may be named a second component and the second component may also be similarly named the first component, without departing from the scope of the present disclosure. The term and/or includes a combination of a plurality of related described items or any one of the plurality of related described items.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element interposed therebetween.

Terms used in the present specification are used only in order to describe specific exemplary embodiments rather than limiting the present invention. Singular forms are intended to include plural forms unless the context clearly indicates otherwise. It should be understood that terms such as "include" or "have" in this application do not preliminarily exclude the presence or addition of features, numbers, steps, operations, components, parts, or combinations thereof described in the specification.

Unless indicated otherwise, it is to be understood that all the terms used in the specification including technical and scientific terms have the same meaning as those that are generally understood by those who skilled in the art.

Terms generally used and defined by a dictionary should be interpreted as having the same meanings as meanings within a context of the related art and should not be interpreted as having ideal or excessively formal meanings unless being clearly defined otherwise in the present specification.

In addition, each configuration, process, process, method, etc., included in each embodiment of the present invention may be technically shared within a range that does not contradict each other.

Figure 2:
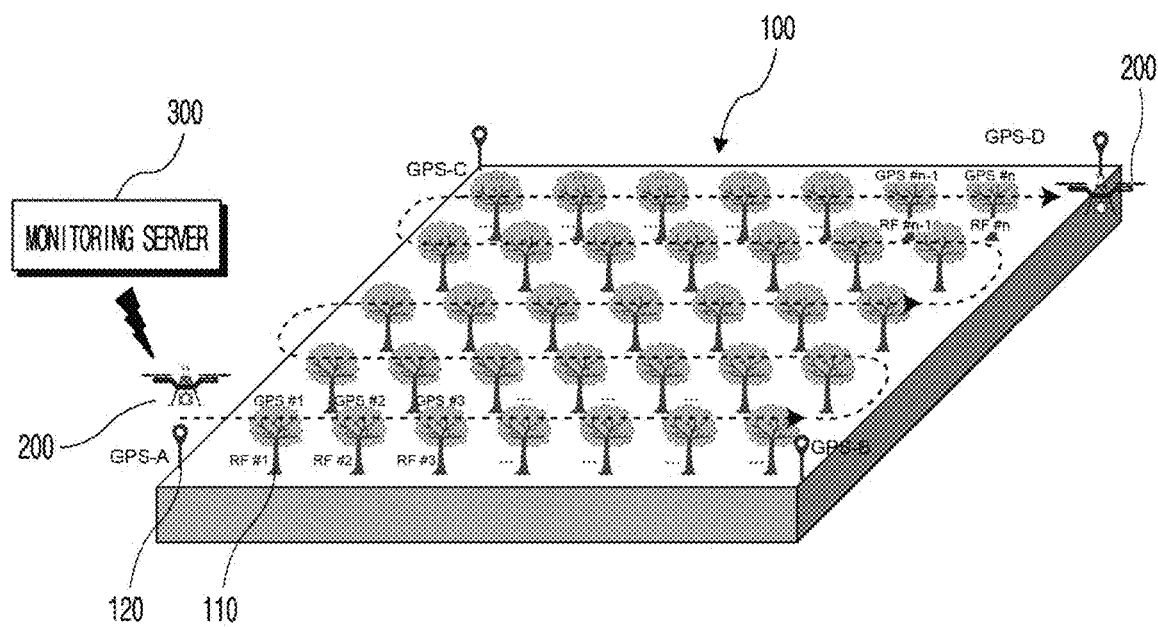
FIG. 2 is a diagram explaining a configuration of a fruit quantity measurement system according to an embodiment of the present invention.

FIG. 2 is a diagram explaining a configuration of a fruit quantity measurement system according to an embodiment of the present invention.

Referring to FIG. 2, the fruit quantity measurement system includes, but is not limited to, an unmanned aerial vehicle 200 flying over a fruit tree region 100 and a monitoring server 300 connected to the unmanned aerial vehicle 200 through a communication network.

First, an RF transmitter 110 transmitting RF signals to each fruit tree is installed in the fruit tree region 100, and at least one GPS unit 120 providing GPS information GPS-A, GPS-B, GPS-C, and GPS-D is installed at each boundary point of the fruit tree region 100 having a predetermined area. Here, the GPS unit 120 is a device capable of collecting location information, and may be implemented as a mobile communication terminal, a beacon, an RFID tag, etc., as well as a GPS. In addition, the RF transmitter 110 is attached to each fruit tree in the form of an RFIC tag, and may transmit a unique identification number for each fruit tree as an RF signal.

A user terminal 400 for managing the fruit tree region 100 may provide the monitoring server 300 with a fruit tree arrangement map including an area of its own fruit tree region and an arrangement state of fruit trees. The monitoring server 300 may create and store the fruit tree arrangement map in the form of a map in which address information of a fruit tree region, aerial photographs, and text information on the arrangement of the fruit trees are integrated, and then provide the fruit tree arrangement map to the user terminal 400.

The unmanned aerial vehicle 200 receives GPS information from the GPS unit 120 installed in the fruit tree region, receives the RF signals transmitted from the RF transmitters 110 installed for each fruit tree, and transmits the GPS information and RF signals to the monitoring server 300. In addition, the unmanned aerial vehicle 200 captures a fruit tree image using at least one image sensor while flying in the sky above the fruit tree region based on a predetermined flight plan, and provides the captured fruit tree image to the monitoring server 300.

The monitoring server 300 receives the GPS information and RF signals from the unmanned aerial vehicle 200, matches location data for each fruit tree, and stores the matched location data in a database. Fruit tree images are analyzed to measure the number of fruits for each fruit tree, and the fruit counting information is stored in the database. The stored location data or fruit counting information for each fruit tree is provided to the user terminal 400 according to the request of the user terminal 400 that has been authorized in advance.

The monitoring server 300 may be a computer body for a server in a general sense, and may be implemented in various types of devices capable of performing a server role. Specifically, the monitoring server 300 may be implemented in a computing device including a communication unit (not illustrated), a memory (not illustrated), a processor (not illustrated), and a database (not illustrated), and may be implemented as a smartphone, a TV, a PDA, a tablet PC, a PC, a notebook PC, other user terminal devices, and the like.

Figure 3:
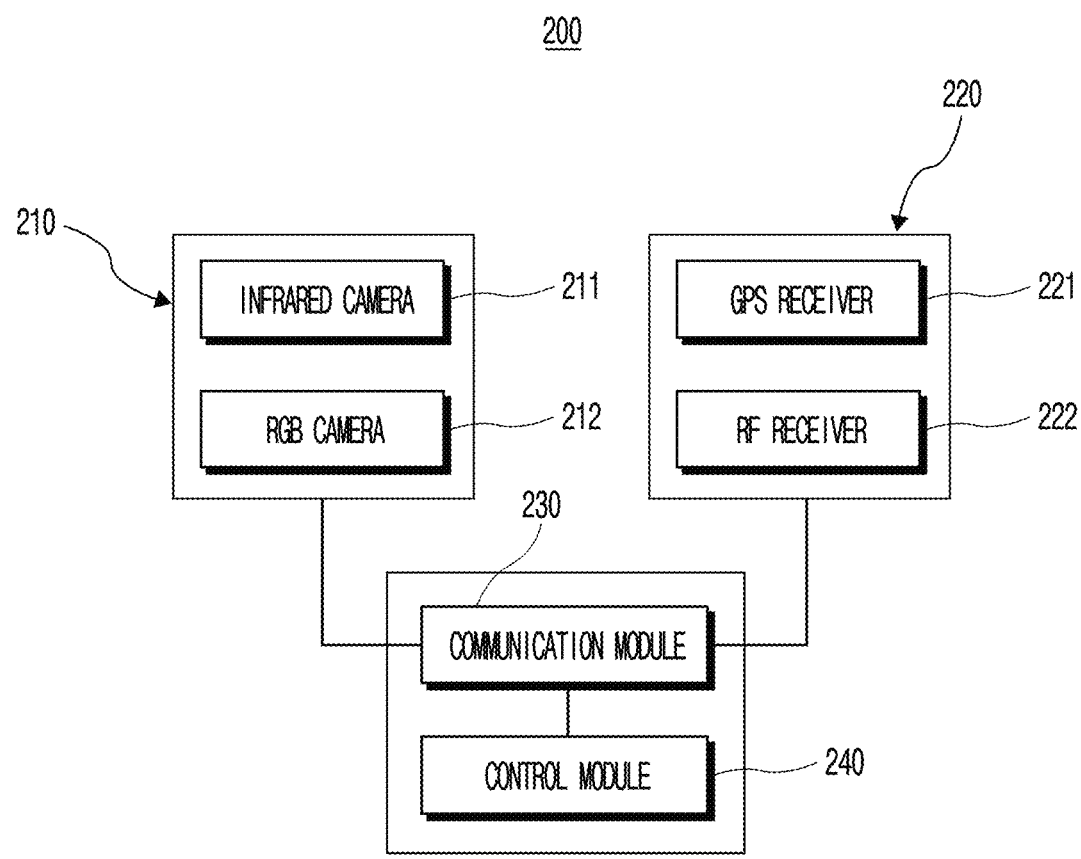
FIG. 3 is a block diagram illustrating a configuration of an unmanned aerial vehicle according to an embodiment of the present invention.
Figure 4:
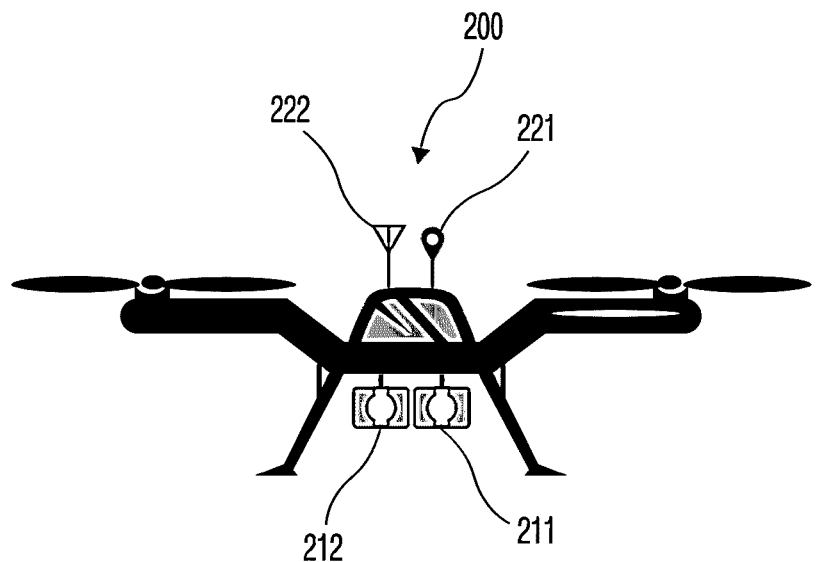
FIG. 4 is a front view illustrating an unmanned aerial vehicle according to an embodiment of the present invention.
Figure 5:
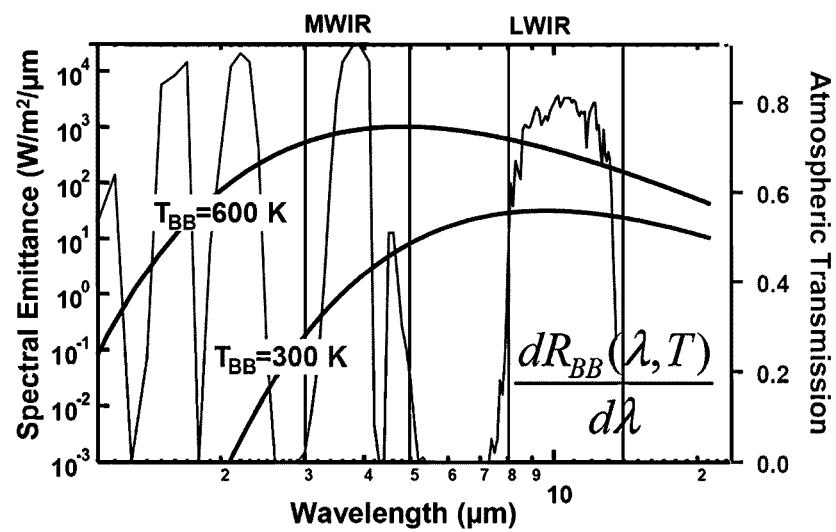
FIG. 5 is a diagram illustrating spectral distribution of a general long-wavelength infrared band.

FIG. 3 is a block diagram illustrating a configuration of an unmanned aerial vehicle according to an embodiment of the present invention, FIG. 4 is a front view illustrating the unmanned aerial vehicle according to the embodiment of the present invention, and FIG. 5 is a diagram illustrating spectral distribution of a general long-wavelength infrared band.

The unmanned aerial vehicle 200 is a remotely controlled or self-controlled aerial vehicle without a person riding, and may be equipped with a camera, a sensor, communication equipment, or other equipment depending on the purpose of use. The unmanned aerial vehicle 200, commonly referred to as a drone, includes a remote piloted vehicle (RPV), an unmanned/uninhabited/unhumanized aerial vehicle system (UAV), an unmanned aircraft system (UAS), a remote piloted air/aerial vehicle (RPAV), a remote piloted aircraft system (RPAS), robot aircraft, etc.

Referring to FIGS. 3 and 4, the unmanned aerial vehicle 200 includes, but is not limited to, a camera 210, a receiver 220, a communication module 230 and a control module 240.

The camera 210 may be one or more cameras using an RGB sensor and an infrared sensor. The infrared camera 211 or thermal imaging camera is a contactless measuring device that detects infrared energy and converts the detected infrared energy into a real image, and generates an image using heat rather than visible light. That is, the infrared camera 211 generates an image by receiving light of an infrared wavelength band and outputting the received light as a digital or analog image.

In general, infrared is divided into near-infrared (NIR, 0.7 to 1.4 μm), shortwavelength infrared (SWIR, 1.4 to 3 μm), mid-wavelength infrared (MWIR, 3 to 5 μm), and long-wavelength infrared (8 to 14 μm), and far-infrared (FIR, 15 to 1000 μm).

As illustrated in FIG. 5, the infrared camera 211 of the present invention may generate an infrared image targeting long-wavelength infrared (LWIR, 8-14 μm). A general infrared camera uses a sensor that does not distinguish infrared wavelength bands, in particular, long-wavelength infrared from other wavelengths, but the infrared camera 211 generates an image targeting long-wavelength infrared. Accordingly, the infrared camera 211 may capture even fruit that is covered with leaves or other obstacles, and extract temperature information of main areas (leaves, branches, fruits, etc.) of interest of the fruit tree from the acquired infrared image.

In this way, the long-wavelength infrared camera 211 may receive infrared rays emitted from a surface of a fruit tree and generate an infrared image of a temperature distribution on the surface of the object, thereby distinguishing an object according to radiation intensity. The radiation intensity may be calculated from the radiation energy and area of a target object. By using the radiation curve, it can be seen that maximum radiation intensity of the target object at a temperature of 30° C. appears at a wavelength of 10 μm.

Infrared, thermal energy, or light are all forms of energy in a category of the electromagnetic spectrum. However, a camera that may detect visible light does not have the ability to detect thermal energy, but a camera that detects thermal energy may not detect visible light.

Therefore, the RGB camera 212 acquires an RGB image of each fruit tree so that the unmanned aerial vehicle 200 may be located on top of a specific fruit tree without overlapping with neighboring fruit trees and the infrared camera 211 may acquire infrared images for fruit counting for each fruit tree. In this case, the fruit tree image may include an RGB image and an infrared image.

The receiver 220 includes a GPS receiver 221 and an RF receiver 222. The GPS receiver 221 receives the GPS information so that the unmanned aerial vehicle 200 recognizes location information and moves to a fruit tree region, and moves to a preset fruit tree using pre-stored location data. The RF receiver 222 receives uniquely identifiable RF signals for each fruit tree transmitted from the RF transmitter 110 installed for each fruit tree.

The communication module 230 transmits the fruit tree image captured by the camera 210, and the GPS information and the RF signal received from the receiver 220 to the monitoring server 300, and receives a flight control signal transmitted from the monitoring server 300.

The control module 240 may control the operations of the receiver 220 and the camera 210, including flight operations (take-off, landing, attitude control, flight path determination, etc.) of the unmanned aerial vehicle 200, and perform a control operation necessary for steering the unmanned aerial vehicle 200 based on an external flight control signal.

Figure 6:
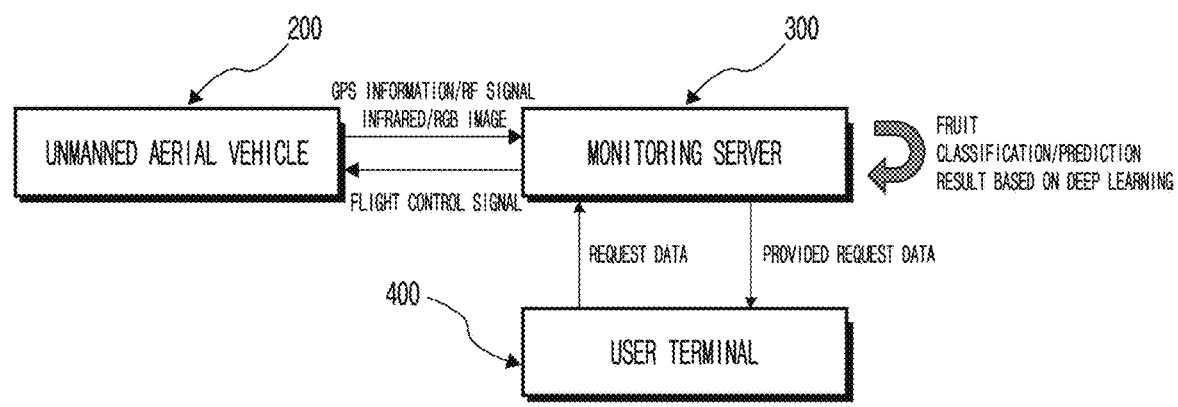
FIG. 6 is a diagram illustrating main signal flows of a fruit quantity measurement system according to an embodiment of the present invention.
Figure 7:
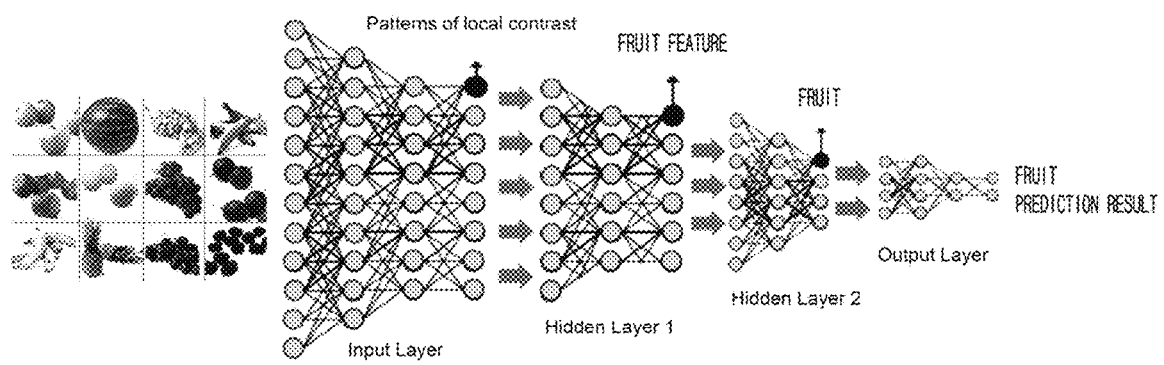
FIG. 7 is a diagram explaining a deep learning-based fruit recognition algorithm of a monitoring server according to an embodiment of the present invention.

FIG. 6 is a diagram explaining a main signal flow of a fruit quantity measurement system according to an embodiment of the present invention, and FIG. 7 is a diagram explaining a deep learning-based fruit recognition algorithm of a monitoring server according to an embodiment of the present invention.

Referring to FIGS. 6 and 7, the monitoring server 300 may receive flight information, fruit tree images including infrared images and RGB images, GPS information, and RF signals from the unmanned aerial vehicle 200, and may generate flight control signals according to location data for each fruit tree according to the flight information, the GPS information, and the RF signals and transmit the generated signals to the unmanned aerial vehicle 200.

In addition, the monitoring server 300 may determine the flight path of the unmanned aerial vehicle 200 based on the pre-stored fruit tree arrangement map, and generate the flight control signal so that the unmanned aerial vehicle 200 may automatically or semi-automatically fly according to the determined flight path and transmit the generated flight control signal to the unmanned aerial vehicle 200.

The user terminal 400 may request location data or fruit counting information for each fruit tree from the monitoring server 300, and the monitoring server 300 may provide data requested by the user terminal 400 in the form of various reports such as tables, time series charts showing time series changes, line charts, bar graphs, region charts showing a distribution of fruit tree regions for each region, or pie charts.

The monitoring server 300 may set fruit tree images including RGB images and infrared images transmitted from the unmanned aerial vehicle 200 as input data, input the input data to a deep learning-based fruit recognition algorithm to calculate fruit classification and prediction results, and provide the calculated fruit classification and prediction results to the user terminal 400.

In this case, the deep learning-based fruit recognition algorithm may extract the fruit regions from the fruit tree images, extract features for each extracted fruit region, and then provide the fruit classification and prediction results based on the extracted features. To this end, the deep learning-based fruit recognition algorithm generates training data for training a plurality of fruit images corresponding to big data, stores the generated training data in a database, and analyzes the training data to set features for each fruit including the form of the size, shape, color, branch, leaf, or the like of each fruit based on the fruit determination criterion and train the classifier Therefore, the deep learning-based fruit recognition algorithm may output the classification and prediction results including the type and quantity of fruit by the trained classifier when the fruit tree images are input as input data.

As illustrated in FIG. 7, the deep learning-based fruit recognition algorithm may be implemented as a deep neural network (DNN) having a structure of an input layer, a hidden layer, and an output layer. The deep neural network refers to a system or a network that builds one or more layers and makes a determination based on a plurality of data. For example, the deep neural network may be implemented as a set of layers including a convolutional pooling layer, a locally-connected layer, and a fully-connected layer. A convolutional pooling layer or a local access layer may be configured to extract features within an image. The fully-connected layer may determine a correlation between features of an image. In some embodiments, the overall structure may be a convolutional neural network (CNN) structure which is a structure in which the local connection layer is connected to the convolutional neural network and the fully-connected layer is connected to the local connection layer. In addition, the deep neural network may be formed in a recurrent neural network (RNN) structure in which nodes of each layer include edges pointing to the nodes and are connected recursively. The deep neural network may include various determination criteria (i.e., parameters), and further include new determination criteria (i.e., parameters) through analysis of the input image.

In particular, the convolutional neural network may be implemented as a structure in which a feature extraction layer self-training a feature with greatest discriminative power from the given image data and a prediction layer training a prediction model to produce highest prediction performance based on the extracted features.

The feature extraction layer may be formed in a structure in which a convolution layer that applies a plurality of filters to each region to create a feature map and a pooling layer that pools a feature map spatially to extract features invariant to a change in position or rotation are alternately repeated several times. The hidden layer of the CNN can be composed of a combination of the pooling layer and the fully-connected layer as well as the convolutional layer.

The deep learning-based fruit recognition algorithm may extract various levels of features from low-level features such as points, lines, and surfaces to complex and meaningful high-level features. The features finally extracted by repeating the convolutional layer and the pooling layer may be used for the training and prediction of the classifier because classification models such as multi-layer perception (MLP) or support vector machine (SVM) are coupled in the form of the fully-connected layer.

Figure 8:
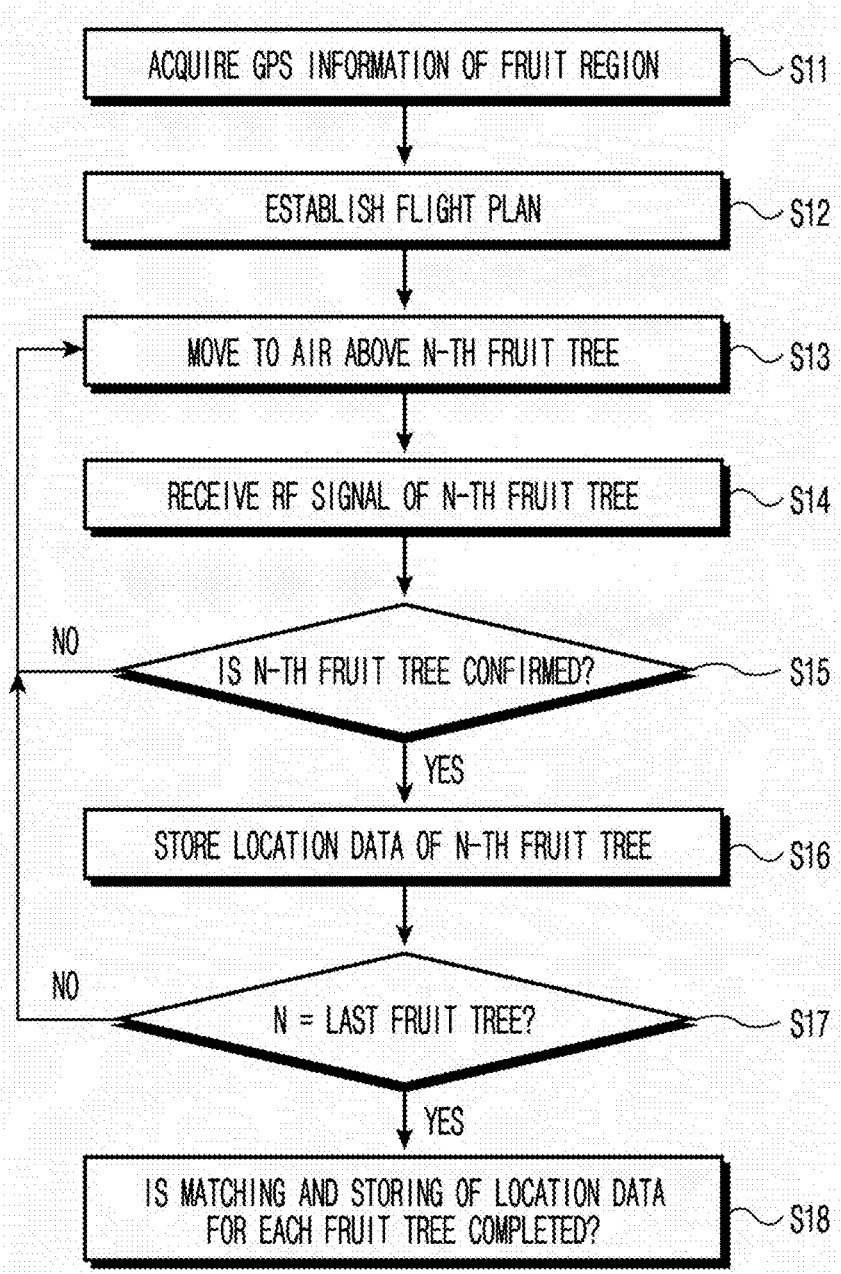
FIG. 8 is a flowchart explaining a process of matching location data for each fruit tree in a fruit quantity measurement method according to an embodiment of the present invention.
Figure 9:
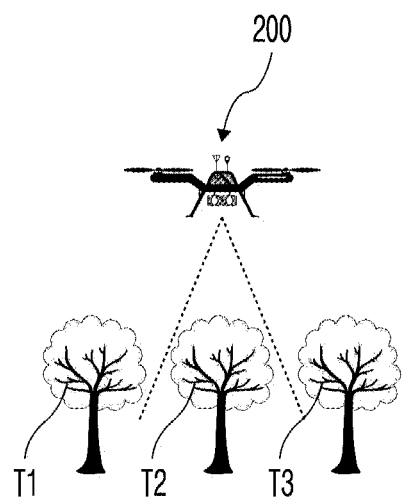
FIG. 9 is a diagram explaining a positioning process of an unmanned aerial vehicle according to an embodiment of the present invention.
Figure 10:
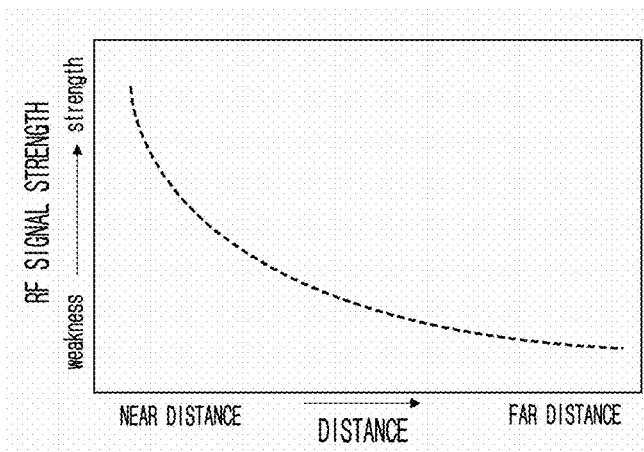
FIG. 10 is a diagram explaining a process of identifying a fruit tree using RF received signal strength according to distance according to an embodiment of the present invention.

FIG. 8 is a flowchart explaining a process of matching location data for each fruit tree in a fruit quantity measurement method according to an embodiment of the present invention. FIG. 8 is a flowchart explaining a process of matching location data for each fruit tree in a fruit quantity measurement method according to an embodiment of the present invention, FIG. 9 is a diagram explaining a positioning process of an unmanned aerial vehicle according to an embodiment of the present invention, and FIG. 10 is a diagram explaining a process of identifying a fruit tree using RF received signal strength according to distance according to an embodiment of the present invention.

Referring to FIGS. 8 to 11, the monitoring server 300 may acquire GPS information from the GPS unit 120 installed at the boundary point of the fruit tree region, for example, four outermost point (S11), and calculate the area of the fruit tree region based on the acquired GPS information, establish a flight plan for at least one unmanned aerial vehicle 200 for fruit tree recognition, and allow the unmanned aerial vehicle 200 to be controlled automatically or semi-automatically according to the flight plan (S12).

In this case, the flight plan may include a flight start/end point, measurement time for acquiring RF signals or images for each fruit tree, an expected collision point between unmanned aerial vehicles, avoidance time or route or flight time schedule information at the expected collision point, and the like.

The unmanned aerial vehicle 200 moves in the air above the first fruit tree based on the flight plan (S13) and receives the RF signal from the RF transmitter 110 attached to the first fruit tree (S14).

As illustrated in FIG. 9, the unmanned aerial vehicle 200 uses the RGB camera 212 to recognize a position that does not overlap with the corresponding fruit tree T2 and the neighboring fruit trees T1 and T3 in order to move to an upper portion of a preset fruit tree T2. This may prevent the unmanned aerial vehicle 200 from obtaining redundant infrared images of the preset fruit tree T2 and the neighboring fruit trees T1 and T3 in the case of a densely planted fruit tree region.

Figure 11:
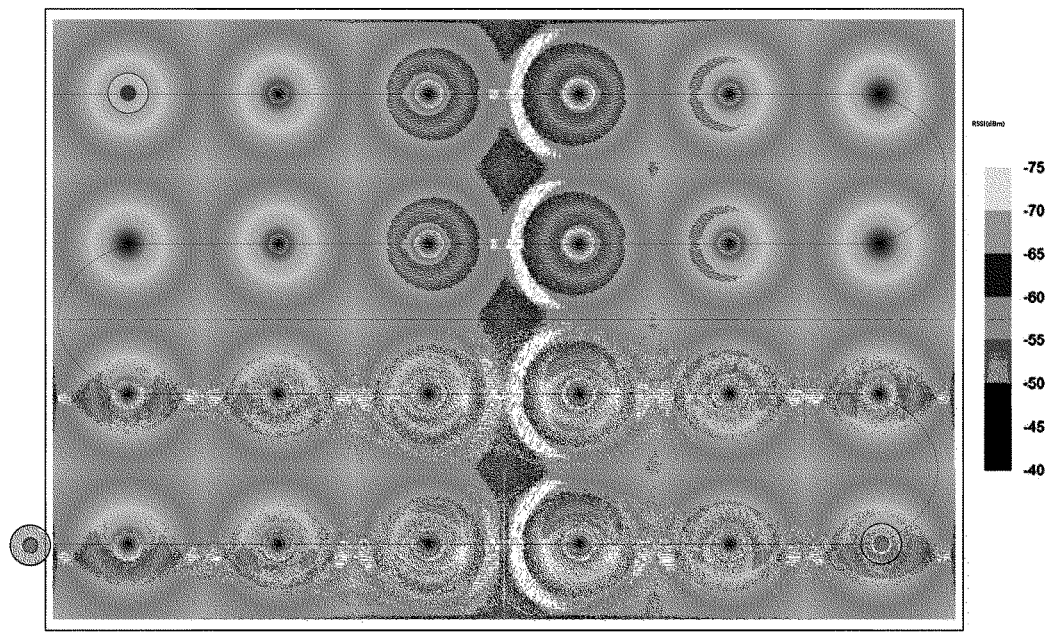
FIG. 11 is an exemplary diagram illustrating a received signal strength distribution at a position of an unmanned aerial vehicle according to an embodiment of the present invention.

In addition, as illustrated in FIGS. 10 and 11, the unmanned aerial vehicle 200 located above the fruit trees may receive unique identification RF signals transmitted from several fruit trees T1, T2, T3, . . . TN, as illustrated in FIG. 11, the received signal strength indicator (RSSI) for a plurality of RF signals may be measured and the signal strength for a plurality of RF signals may be measured to select the RF signal with the closest distance, that is, the unique identification RF signal with the highest signal strength, and it may be recognized that the unmanned aerial vehicle 200 is located on the top of the fruit tree corresponding to the selected unique identification RF signal (S15).

The monitoring server 300 acquires matching information between an RF signal RF #1 and GPS information GPS #1 of a first fruit tree, and stores location data of the first fruit tree (S16).

In this way, the monitoring server 300 matches and stores location data for each fruit tree from the first fruit tree to an N-th fruit tree, which is the last fruit tree, using the GPS information and RF signal received from the unmanned aerial vehicle 200 (S17 and S18).

Figure 12:
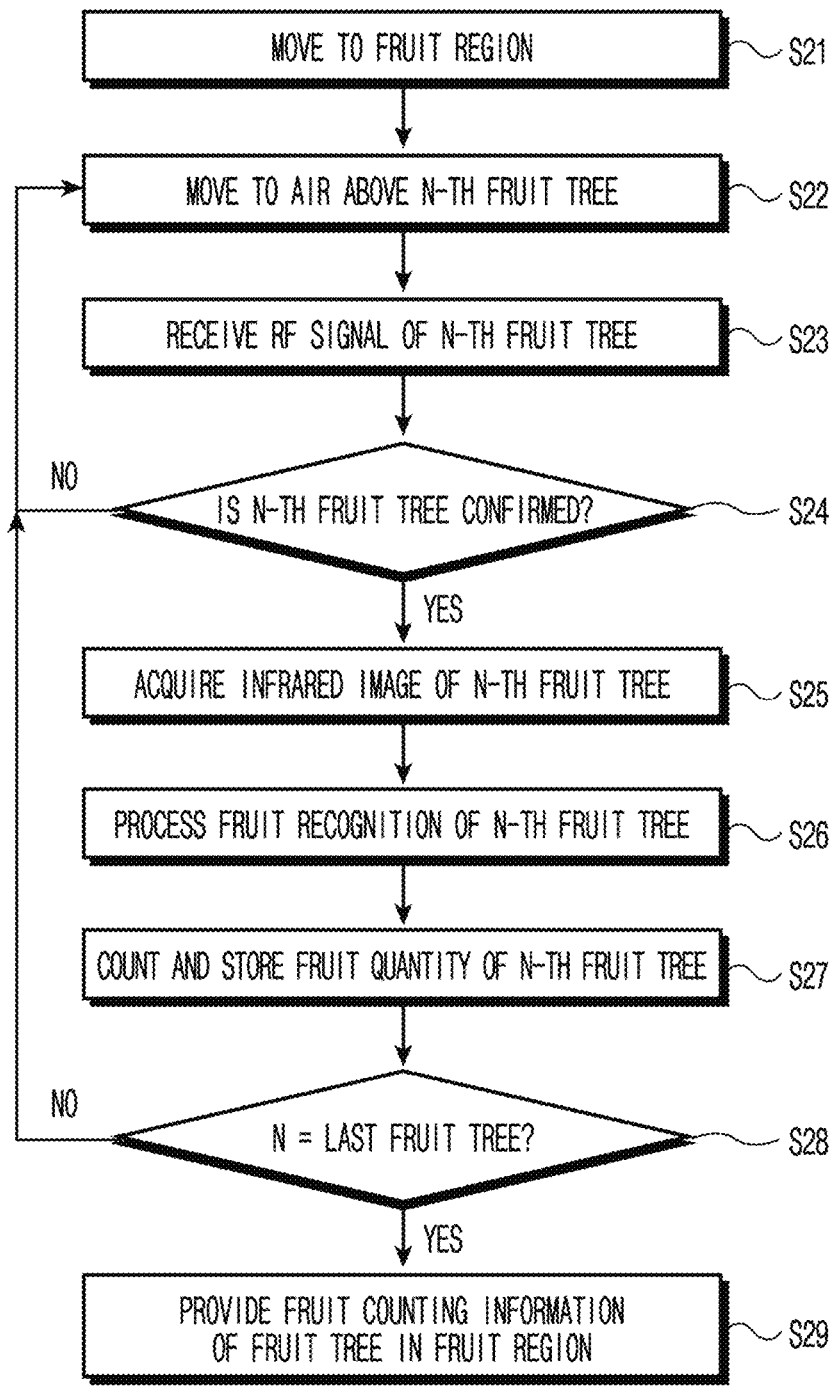
FIG. 12 is a flowchart explaining a fruit quantity measurement method according to an embodiment of the present invention.
Figure 13:
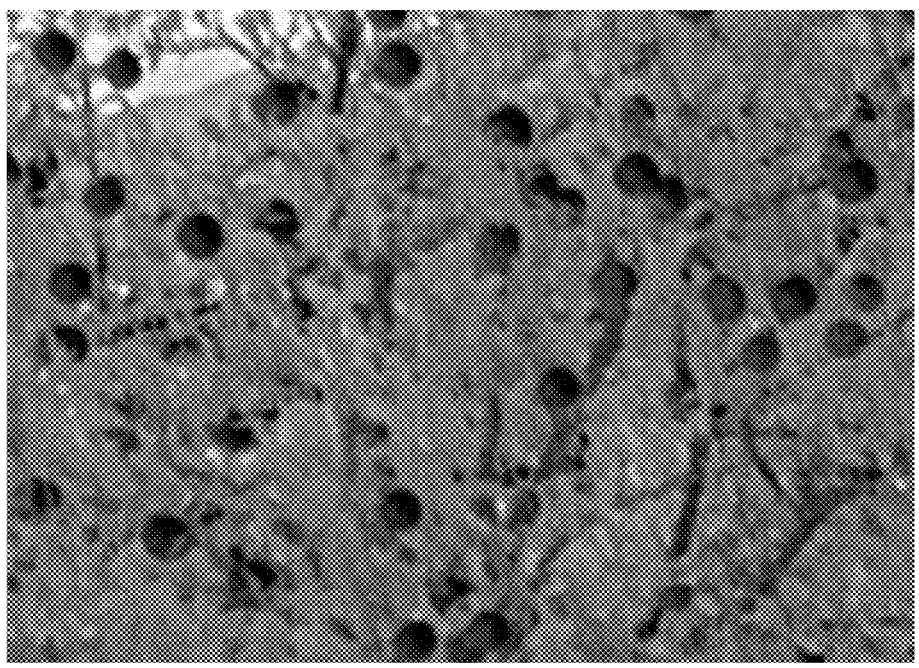
FIG. 13 is an exemplary view illustrating an infrared image acquired through an unmanned aerial vehicle according to an embodiment of the present invention.
Figure 14:
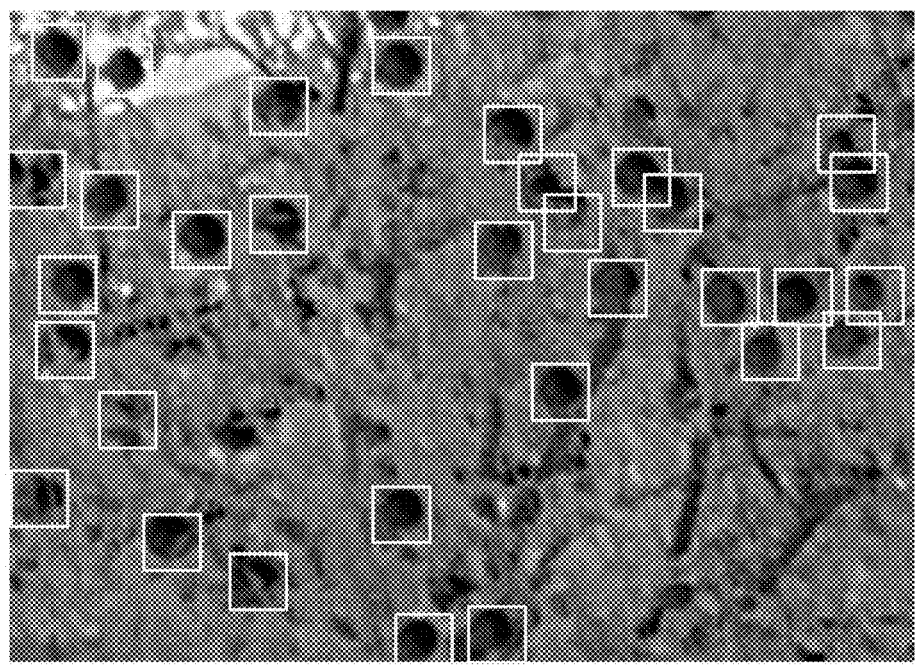
FIG. 14 is an exemplary diagram illustrating a process of detecting a fruit area in an infrared image of FIG. 13.
Figure 15:
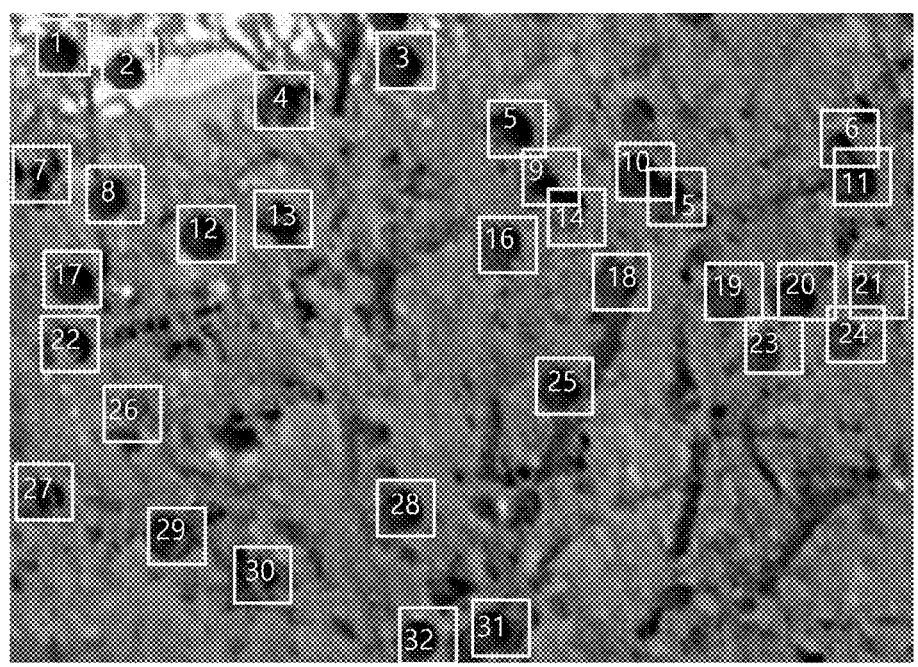
FIG. 15 is an exemplary view illustrating a fruit counting process based on the fruit region detected in FIG. 14.

FIG. 12 is a flowchart explaining a fruit quantity measurement method according to an embodiment of the present invention, FIG. 13 is an exemplary view illustrating an infrared image acquired through an unmanned aerial vehicle according to an embodiment of the present invention, FIG. 14 is an exemplary diagram illustrating a process of detecting a fruit area in an infrared image of FIG. 13, and FIG. 15 is an exemplary view illustrating a fruit counting process based on the fruit region detected in FIG. 14.

As illustrated in FIG. 12, the monitoring server 300 moves the unmanned aerial vehicle 200 to the fruit tree region and moves the unmanned aerial vehicle 200 to the air above the N-th fruit tree (S21 and S22). In this case, the monitoring server 300 may accurately move the unmanned aerial vehicle 200 to the top of the N-th fruit tree using the pre-stored location data.

The unmanned aerial vehicle 200 may receive the RF signals of the N-th fruit tree (S23), select an RF signal having the largest signal intensity among the received RF signals, and then match the selected RF signal with the RF signal of the pre-stored location data to determine whether or not they match, thereby confirming whether the N-th fruit tree is correct (S24). In this case, the unmanned aerial vehicle 200 may recognize and determine a flight altitude position for acquiring a non-overlapping image between corresponding fruit trees with an RGB camera in the sky above the fruit trees.

When the N-th fruit tree is identified, the infrared camera 211 of the unmanned aerial vehicle 200 is used to acquire an infrared image (S250), perform fruit recognition processing of the N-th fruit tree (S26), and measure and store the number of fruits (S27).

As illustrated in FIGS. 13 to 15, the monitoring server 300 inputs an infrared image of a fruit tree (e.g., a citron fruit tree) to the deep learning-based fruit recognition algorithm, recognizes a fruit through the classifier to detect a fruit region, and performs fruit counting in the detected fruit region.

When the fruit counting from the first fruit tree to the last fruit tree is completed, the monitoring server 300 may store fruit counting information for each fruit tree in the fruit tree region and total fruit counting information, and provide the fruit counting according to a request of the user terminal 400 (S28 and S29).

The monitoring server 300 may not only provide location data for each fruit tree and fruit counting information for each fruit tree, but may also use the location data for each fruit tree and fruit counting information for each fruit tree to provide information on various fruit trees such as a distribution (number of mature trees) of fruit trees in the fruit tree region and arrangement information, income calculation information according to fruit counting information, production information per unit of mature tree area, production forecast information based on weather forecast information or accumulated production information, and fruit tree planting plan.

Although each process is described as sequentially executed in FIGS. 8 and 12, this is merely an example of the technical idea of one embodiment of the present invention. Since those skilled in the art to which an embodiment of the present invention pertains may change and execute the sequence illustrated in each drawing within the range not departing from the essential characteristics of the embodiment of the present invention, and one or more of each process may be applied in parallel with various modifications and variations, FIGS. 8 and 12 are not limited to a time-series sequence.

Meanwhile, the processes illustrated in FIGS. 8 and 12 may be implemented as a computer readable code in a computer readable recording medium. The computer-readable recording medium may include all kinds of recording apparatuses in which data that may be read by a computer system are stored. That is, the computer-readable recording medium includes storage media such as magnetic storage media (e.g., a read-only memory (ROM), a floppy disk, a hard disk, etc.) and optically readable media (e.g., a compact disc read-only memory (CD-ROM), a digital video disc (DVD), etc.). In addition, the computer readable recording media may be distributed in computer systems connected to each other through a network, such that the computer readable codes may be stored and executed in the computer readable recording media in a distributed scheme.

The spirit of the present embodiment is illustratively described hereinabove. It will be appreciated by those skilled in the art to which the present embodiment pertains that various modifications and alterations may be made without departing from the essential characteristics of the present embodiment. Accordingly, the present embodiments are not to limit the spirit of the present embodiment, but are to describe the spirit of the present disclosure. The technical idea of the present embodiment is not limited to these embodiments. The scope of the present disclosure should be interpreted by the following claims, and it should be interpreted that all the spirits equivalent to the following claims fall within the scope of the present disclosure.

This patent is the result of a study conducted with the support of the Korea Institute for Advancement of Technology with financial resources from the Korean government (Ministry of Trade, Industry and Energy) in 2021 (Unique Project Number 1415176969, Detailed Project Number: P0014718, Project name: Smart farming demonstration spread project using 5G-based drones).

This patent is the result of a study conducted with the support of the Korea Evaluation Institute of Industrial Technology with financial resources from the Korean government (Ministry of Trade, Industry and Energy) in 2022 (Unique Project Number 1415181149, Detailed Project Number: 20018828, Project name: Development of optical filter for wavelength control and light source module for lighting device)

CROSS-REFERENCE TO RELATED APPLICATION

This application claims priority under 35 U.S.C. § 119 to Korean Patent Application No. 10-2021-0033932, filed on Mar. 16, 2021, in the Korean Intellectual Property Office, the disclosure of which is incorporated herein by reference in its entirety. In addition, if this patent application claims priority for the same reason as above for countries other than the United States, all the contents are incorporated into this patent application as references.

What is claimed is:

1. A fruit quantity measurement system comprising:
an unmanned aerial vehicle configured to receive GPS information about a fruit tree region of a predetermined area and an RF signal transmitted from an RF transmitter installed for each fruit tree and provide fruit tree images captured using at least one image sensor while flying based on a predetermined flight plan over the fruit tree region; and
a monitoring server configured to be connected to the unmanned aerial vehicle through a communication network to receive GPS information and an RF signal from the unmanned aerial vehicle, match and store location data for each fruit tree, analyze the fruit tree image, measure a number of fruits for each fruit tree, store fruit counting information, and provide the stored location data or fruit counting information for each fruit tree according to a request from a user terminal authorized in advance,
wherein the unmanned aerial vehicle includes one or more cameras using an RGB sensor and an infrared sensor, obtains an infrared image targeting long-wavelength infrared, measures infrared rays emitted from a surface of each fruit tree to generate an infrared image of a temperature distribution on a surface of an object, thereby distinguishing objects based on radiation intensity,
the unmanned aerial vehicle includes a GPS receiver and an RF receiver, uses the GPS receiver to receive GPS information and move to a fruit tree region, uses previously stored location data to move to a predetermined fruit tree, and uses the RF receiver to receive a uniquely identifiable RF signal for each fruit tree transmitted from an RF transmitter mounted on each fruit tree, the monitoring server obtains GPS information from a GPS unit installed at a boundary of the fruit tree region, establishes a flight plan for fruit tree recognition based on the obtained GPS information, moves the unmanned aerial vehicle to an upper portion of a fruit tree based on the flight plan to receive an RF signal from the RF transmitter attached to the fruit tree, receives RF signals transmitted from a plurality of fruit trees, measures the received signal strength of the RF signals to select a unique identification RF signal with a highest signal strength and recognize that the unmanned aerial vehicle is located above corresponding fruit tree associated with the selected unique identification RF signal, obtains matching information between the RF signal of corresponding fruit tree and GPS information of corresponding fruit tree, stores location data of corresponding fruit tree, and performs above-described operations for each of the plurality of fruit trees to store location data of each of the plurality of fruit trees, the monitoring server moves the unmanned aerial vehicle to an air above a fruit tree, receives RF signals from fruit trees, selects the RF signal with a strongest signal strength among the received RF signals, determines whether the selected RF signal matches with an RF signal of previously stored location data to confirm that the unmanned aerial vehicle is over corresponding fruit tree, and acquires an infrared image from the unmanned aerial vehicle to process fruit recognition of corresponding fruit tree and measure a number of fruit corresponding fruit tree, the unmanned aerial vehicle recognizes and determines a flight altitude position for acquiring non-overlapping images between corresponding fruit trees with an RGB camera in a sky above the fruit trees.

2. The fruit quantity measurement system of claim 1, wherein the monitoring server performs a deep learning-based fruit recognition algorithm that extracts fruit regions from the fruit tree image, extracts features from the extracted fruit regions, and then provides fruit classification and prediction results based on the extracted features.

3. The fruit quantity measurement system of claim 2, wherein the deep learning-based fruit recognition algorithm generates and stores training data for training a plurality of fruit images corresponding to big data, trains a classifier by setting the features of each fruit, including a size, a shape, and a color of each fruit, as fruit determination criteria through the analysis of the stored training data, and outputs the fruit classification and prediction results including a type and quantity of fruit for the fruit tree image input by the trained classifier.

4. A fruit quantity measurement method performed by a monitoring server that performs a fruit tree monitoring function for a fruit tree region, the fruit quantity measurement method comprising:

acquiring GPS information about the fruit tree region, and generating a flight plan for at least one unmanned aerial vehicle for fruit tree recognition based on the acquired GPS information;

transmitting a flight control signal to the unmanned aerial vehicle for moving the unmanned aerial vehicle to air above a predetermined fruit tree based on the flight plan of the unmanned aerial vehicle;

identifying a predetermined fruit tree by receiving an RF signal transmitted from an RF transmitter installed in the fruit tree through the unmanned aerial vehicle, and matching and storing unique identification information of the predetermined fruit tree and location data; and receiving fruit tree images through the unmanned aerial vehicle, analyzing the fruit tree images, measuring the fruit quantity for each fruit tree, and storing fruit counting information, wherein the unmanned aerial vehicle includes one or more cameras using an RGB sensor and an infrared sensor, obtains an infrared image targeting long-wavelength infrared, measures infrared rays emitted from a surface of each fruit tree to generate an infrared image of a temperature distribution on a surface of an object, thereby distinguishing objects based on radiation intensity, the unmanned aerial vehicle includes a GPS receiver and an RF receiver, uses the GPS receiver to receive GPS information and move to a fruit tree region, uses previously stored location data to move to a predetermined fruit tree, and uses the RF receiver to receive a uniquely identifiable RF signal for each fruit tree transmitted from an RF transmitter mounted on each fruit tree, the monitoring server obtains GPS information from a GPS unit installed at a boundary of the fruit tree region, establishes a flight plan for fruit tree recognition based on the obtained GPS information, moves the unmanned aerial vehicle to an upper portion of a fruit tree based on the flight plan to receive an RF signal from the RF transmitter attached to the fruit tree, receives RF signals transmitted from a plurality of fruit trees, measures the received signal strength of the RF signals to select a unique identification RF signal with a highest signal strength and recognize that the unmanned aerial vehicle is located above corresponding fruit tree associated with the selected unique identification RF signal, obtains matching information between the RF signal of corresponding fruit tree and GPS information of corresponding fruit tree, stores location data of corresponding fruit tree, and performs above-described operations for each of the plurality of fruit trees to store location data of each of the plurality of fruit trees, the monitoring server moves the unmanned aerial vehicle to an air above a fruit tree, receives RF signals from fruit trees, selects the RF signal with a strongest signal strength among the received RF signals, determines whether the selected RF signal matches with an RF signal of previously stored location data to confirm that the unmanned aerial vehicle is over corresponding fruit tree, and acquires an infrared image from the unmanned aerial vehicle to process fruit recognition of corresponding fruit tree and measure a number of fruit corresponding fruit tree, and transmitting the flight control signal to the unmanned aerial vehicle includes recognizing and determining, by the unmanned aerial vehicle, a flight altitude position for acquiring non-overlapping images between corresponding fruit trees with an RGB camera in a sky above the fruit trees.

5. The fruit quantity measurement method of claim 4, further comprising:

providing stored location data or fruit counting information for each fruit tree according to a request of a user terminal authorized in advance.

6. The fruit quantity measurement method of claim 4, wherein a deep learning-based fruit recognition algorithm extracts fruit regions from the fruit tree image, extracts features from the extracted fruit regions, and then provides fruit classification and prediction results based on the extracted features.

7. The fruit quantity measurement method of claim 6, wherein the deep learning-based fruit recognition algorithm generates and stores training data for training a plurality of fruit images corresponding to big data, trains a classifier by setting the features of each fruit, including a size, a shape, and a color of each fruit, as fruit determination criteria through the analysis of the stored training data, and outputs the fruit classification and prediction results including a type and quantity of fruit for the fruit tree image input by the trained classifier.

\* \* \* \* \*